United States Patent
Mimura et al.

(10) Patent No.: US 6,747,564 B1
(45) Date of Patent: Jun. 8, 2004

(54) SECURITY GUARANTEE METHOD AND SYSTEM

(75) Inventors: Masahiro Mimura, Kawasaki (JP); Yoichi Seto, Sagamihara (JP); Yoshiaki Isobe, Fujisawa (JP); Masaji Aoki, Takasaki (JP)

(73) Assignee: Hitachi, Ltd., Tokyo (JP)

( * ) Notice: Subject to any disclaimer, the term of this patent is extended or adjusted under 35 U.S.C. 154(b) by 402 days.

(21) Appl. No.: 09/604,918

(22) Filed: Jun. 28, 2000

(30) Foreign Application Priority Data

Jun. 29, 1999 (JP) .......................................... 11-183297

(51) Int. Cl.[7] .............................................. G08C 19/00
(52) U.S. Cl. ................... 340/825.6; 340/528; 340/5.52; 340/5.53; 340/5.54; 340/5.7; 340/5.8
(58) Field of Search ............................. 340/825.6, 528, 340/539.11, 527, 5.52, 5.53, 5.7, 572.1, 572.2, 5.83, 5.8, 5.33, 5.54; 109/9; 713/200, 185, 186; 235/380, 382.5

(56) References Cited

U.S. PATENT DOCUMENTS

| | | | |
|---|---|---|---|
| 4,747,139 A | * | 5/1988 | Taaffe .......................... 380/44 |
| 5,400,722 A | * | 3/1995 | Moses et al. ................... 109/2 |
| 5,625,349 A | * | 4/1997 | Disbrow et al. ........ 340/825.31 |
| 5,831,533 A | * | 11/1998 | Kanno ......................... 340/573 |
| 6,351,813 B1 | * | 2/2002 | Mooney et al. ............. 713/185 |

FOREIGN PATENT DOCUMENTS

| | | |
|---|---|---|
| JP | 9-198501 | 7/1997 |
| JP | 10-124668 | 5/1998 |
| JP | 10-149446 | 6/1998 |

* cited by examiner

Primary Examiner—Brian Zimmerman
Assistant Examiner—Vernal Brown
(74) Attorney, Agent, or Firm—Mattingly, Stanger & Malur, P.C.

(57) ABSTRACT

A security system wherein, when a staff enters a building, a smart card carried by the staff is verified, and staff information inclusive of a staff number and fingerprint information is read from the smart card and is stored temporarily in a temporary storage file. When the staff logs on to a terminal, the fingerprint of the staff is read by a fingerprint input device (LS) and verified with the fingerprint information of the temporary storage file for verification. When the staff leaves the building, the staff number is read from the smart card the staff carries, and the corresponding staff information is erased from the temporary storage file. Security of a security object inside a security zone can be improved.

20 Claims, 21 Drawing Sheets

FIG.4

| STAFF NO. | FINGERPRINT INFORMATION |
|---|---|
| ABC10263746 | *************** |
| SDY72619347 | *************** |
| EWD29412823 | *************** |
| OJE973542911 | *************** |

FIG.8

| STAFF NO. | ACCESS DESTINATION | ACCESS TIME | STATUS |
|---|---|---|---|
| ABC10263746 | FRONT DOOR | 99/2/22/ 15:00 | ENTRY |
| SDY72619347 | 213.233.458 | 99/2/22/ 16:30 | LOG-OUT |
| ABC10263746 | 976.247.388 | 99/2/22/ 15:15 | LOG-ON |
| UNKNOWN | 987.329.377 | 99/2/22/ 17:15 | MATCHING FAILURE |
| ABC10263746 | 976.247.388 | 99/2/22/ 17:10 | LOG-OUT |
| ABC10263746 | SOUTHERN DOOR | 99/2/22/ 17:30 | EXIT |

| STAFF NO. | ACCESS RIGHT INFORMATION | | TERM OF VALIDITY | FINGERPRINT INFORMATION |
|---|---|---|---|---|
| | SECTION | LEVEL | | |
| ABC10263746 | ACCOUNTANTS SECTION | C | 99/2/22 15:00 | *************** |
| SDY72619347 | PERSONNEL AFFAIRS SECTION | B | 99/2/22 16:30 | *************** |
| EWD29412823 | DEVELOPMENT SECTION | D | 99/2/22 17:15 | *************** |
| OJE973542911 | PRODUCTION SECTION | D | 99/2/22 18:00 | *************** |

FIG.13

| STAFF NUMBER | MATCHING PARAMETER |
|---|---|
| ABC10263746 | 90 |
| SDF127645398 | 80 |
| LKJ746203472 | 70 |
| UEH12987439 | 60 |

FIG.14

| DATABASE NAME | MATCHING PARAMETER |
|---|---|
| CLIENT INFORMATION | 90 |
| PERSONNEL INFORMATION | 80 |
| WAGES DB | 70 |
| CONFIDENTIAL DOCUMENT | 60 |

FIG.15

| ENVIRONMENT | MATCHING PARAMETER |
|---|---|
| WINTER | 60 |
| SUMMER | 70 |
| SPRING / FALL | 80 |

| FALSE VERIFICATION MEANS | MATCHING PARAMETER |
|---|---|
| STAFF NUMBER | 80 |
| PASSWORD | 70 |
| STAFF NO. + PASSWORD | 60 |
| SIGNATURE VERIFICATION | 60 |

SECURITY GUARANTEE METHOD AND SYSTEM

BACKGROUND OF THE INVENTION

1. Field of the Invention

This invention relates to a technology for guaranteeing security of a security object inside a security zone that only specific persons are allowed to enter and leave.

2. Description of the Related Art

A technology described in JP-A-09-198501, for example, is known as the technology for managing admission/leaving of persons to and from a security zone only specific persons are allowed to enter and leave. This technology compares or verifies biometric information of an authentic person recorded in a management device with biometric information of this person when the person passes through a door of a security zone, permits admission of only the authentic person and prevents admission of unauthorized persons into the security zone.

On the other hand, JP-A-10-124668 and JP-A-10-149446 describe a technology for protecting security of a security object when the security object is an access to a computer system comprising a server and a client.

The technology described in JP-A-10-124668 manages concentratedly the biometric information of the authentic persons in the server, verifies the biometric information of the person accepted by the client with reference to the server when utilization of the computer system is initiated, and permits the authentic person to gain access to the computer system while preventing the access by unauthentic persons.

On the other hand, the technology described in JP-A-10-149446 issues a portable storage device recording the biometric information of an authentic user, such as a smart card, to the authentic user, reads the biometric of the user from the portable storage device carried by the user by the client when utilization of the computer system is initiated, and permits only the authentic user to gain access to the computer system while preventing the access to the computer system by unauthentic users.

When security of a security object inside a security zone that only specific persons are permitted to enter and leave is protected, each prior art technology described above does not operate security of the security zone with security of the security object in the interlocking arrangement with each other. In other words, the prior art technology does not employ the construction in which only the person who enters authentically the security zone is permitted to gain access to the security object. Even those persons who enter unauthentically the security zone can gain access to the security object. Therefore, the prior art is not yet sufficient as security of the security object. Even when it is desired to permit only specific users to enter and leave a computer room and moreover to permit the only the specific users entering authentically the computer room to gain access to the computer system installed inside the computer room, the prior art technology described above cannot exclude the access by unauthentic persons entering the computer room to the computer system.

The technology using the biometric information for verifying the authentic person is the one that can execute authentication with a relatively high probability. The technology described in JP-A-10-124668 manages concentratedly the biometric information as the information inherent to the users by the server, the psychological resistance of the users is great and a large number of biometric information is likely to be stolen at one time. To manage a large number of users, the management cost of the biometric information in the server rises.

On the other hand, the technology described in JP-A-10-149446 needs a reader of the portable storage device such as the smart card and the verification function of the biometric information for each client. Therefore, the system configuration cost becomes high.

To protect security of the security objects existing inside a security zone that extends to a plurality of zones and only specific persons are allowed to enter and leave, each prior art technology described above needs a management device for each door communicating with a plurality of security zones and registration of the biometric information of the authentic persons to the servers of a plurality of security zones. In consequence, the management cost rises, too.

SUMMARY OF THE INVENTION

It is therefore an object of the present invention to improve at a relatively low cost security of a security object in a security zone that only specific persons are permitted to enter and leave.

It is another object of the present invention to improve at a relatively low cost security of a security object in a security zone extending to a plurality of zones.

According to one aspect of the present invention for accomplishing the objects described above, there is provided a security system for permitting only an authentic person to conduct a security object action inside a security zone, comprising a portable device issued to the authentic person and storing verification information capable of verifying authenticity of the portable device and inherent information as information inherent to the person to whom the portable device is issued; security zone security means for verifying authenticity of the portable device by using the verification information stored in the portable device carried by the person intending to enter the security zone, permitting the person carrying the portable device authenticity of which is established or verified to enter the security zone, and rejecting the person carrying the portable device authenticity of which is not verified to enter the security zone; storage means; inherent information read means for reading the inherent information stored in the portable device, from the portable device authenticity of which is verified, carried by the person entering the security zone, and storing the inherent information to the storage means; information input means for accepting the input of information by a person intending to conduct the security object action in the security zone; security object action security means for permitting the person to conduct the security object action when the inherent information matching the information accepted by the information input means is stored in the storage means, and rejecting the person to conduct the security object action when the inherent information matching the information accepted by the information input means is not stored in the storage means; and leaving management means for gaining access to the portable device carried by the person leaving the security zone, stipulating the inherent information the inherent information read means reads from the portable device and stores to the storage means, and erasing the stipulated inherent information from the storage means.

The security system described above keeps the inherent information only while the person remains inside the security zone, and can therefore prevent a large number of inherent information from being stolen at one time. Since the person uses the portable device only when he enters and leaves the security zone, a reader for reading the portable device need not be disposed to a terminal, for example, used for the security object action inside the security zone. In consequence, the security system can lower the build-up cost. The security system can exclude the security object inside the security zone by the person who unauthentically enters the security zone. Even when the biometric information is used as the inherent information of the user, the security system can insure that the biometric information is persistently stored in only the portable device, this security system can mitigate the negative feeling of the users.

When the security system is the one that permits only authentic persons to gain access to a security object in a security zone extending to a plurality of security zones. The system includes security action security means that uses the portable device issued for the authentic person in common to each security zone of a plurality of zones. Therefore, this system can keep security while restricting the build-up cost and the management cost of the users in each zone.

BRIEF DESCRIPTION OF THE DRAWINGS

FIG. 4 is a table showing the content of a temporary storage file;

FIG. 8 is a table showing the content of a log file;

FIG. 13 is a table showing a decision parameter for each staff;

FIG. 14 is a table showing a decision parameter set for each access destination;

FIG. 15 is a table showing a decision parameter set for each season;

DESCRIPTION OF THE EMBODIMENTS

Hereinafter, preferred embodiments of the present invention will be explained about the application to a bank office system that calls for high security, by way of example.

Figure 1:
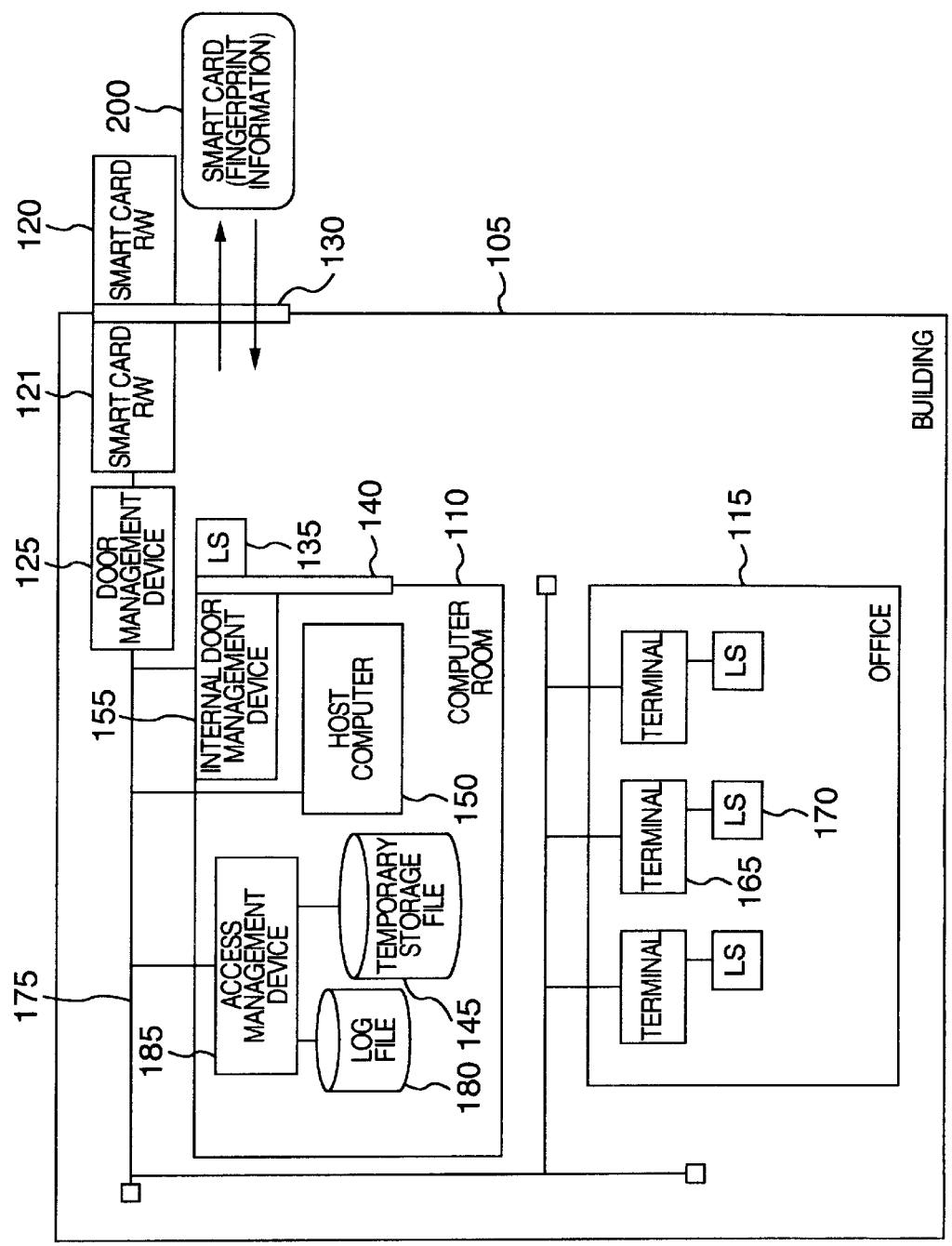
FIG. 1 is a block diagram showing the construction of a security system.

FIG. 1 shows the construction of the security system according to the first embodiment.

As shown in the drawing, the office system to which the security system of this embodiment is applied comprises a building 105 as a security zone which is cut off by a door 130 and which only those staffs who are authorized in advance can enter and leave, an office 115 which staffs utilize ordinarily, and a computer room 110 cut off by an internal door 140. A database storing important information such as customers' information and a host computer 150 having applications for executing banking business are installed inside the computer room 110. Terminals 165 are set up in the office 115 to utilize the resources of the host computer 150. The host computer 150 and the terminals 165 constitute a computer system.

Entry/exist into and out from the computer room 110 is the security object that must be guarded by a higher level of security than entry/exist into and out from the building 105 (office 115) as the security zone. Access to the computer system is the security object that must be guarded by a higher level of security than entry/exist into and out from the building 105 (office 115) as the security zone.

Next, this security system comprises a door management device 125 for controlling opening/closing of the door 130 of the building 105, a smart card reader 120 set outside the door 130 of the building 105, a smart card reader 121 set inside the door 130 of the building 105, an internal door management device 155 for controlling opening/closing of the internal door 140 of the computer chamber 110, a fingerprint input device 135 set outside the internal door management device 155 of the computer room 110, a fingerprint input device 170 provided to each terminal 165, an access management device 185 including a temporary storage file 145 and a log file 180 and set inside the computer room 110, and a functional portion for executing an authentication processing of a correct person by fingerprint information of each terminal 165 that will be described later.

The smart card reader 120 and the smart card reader 121 are connected to the door management device 125. The fingerprint input device 135 is connected to the internal door management device 155. The fingerprint input device 170 is connected to the terminal 165. The door management device 125, the internal door management device 155 and the terminal 165 are connected to the access management device 185 by a network 175.

This security system issues in advance a smart card 200 recording user's information to an authentic user.

Figure 2:
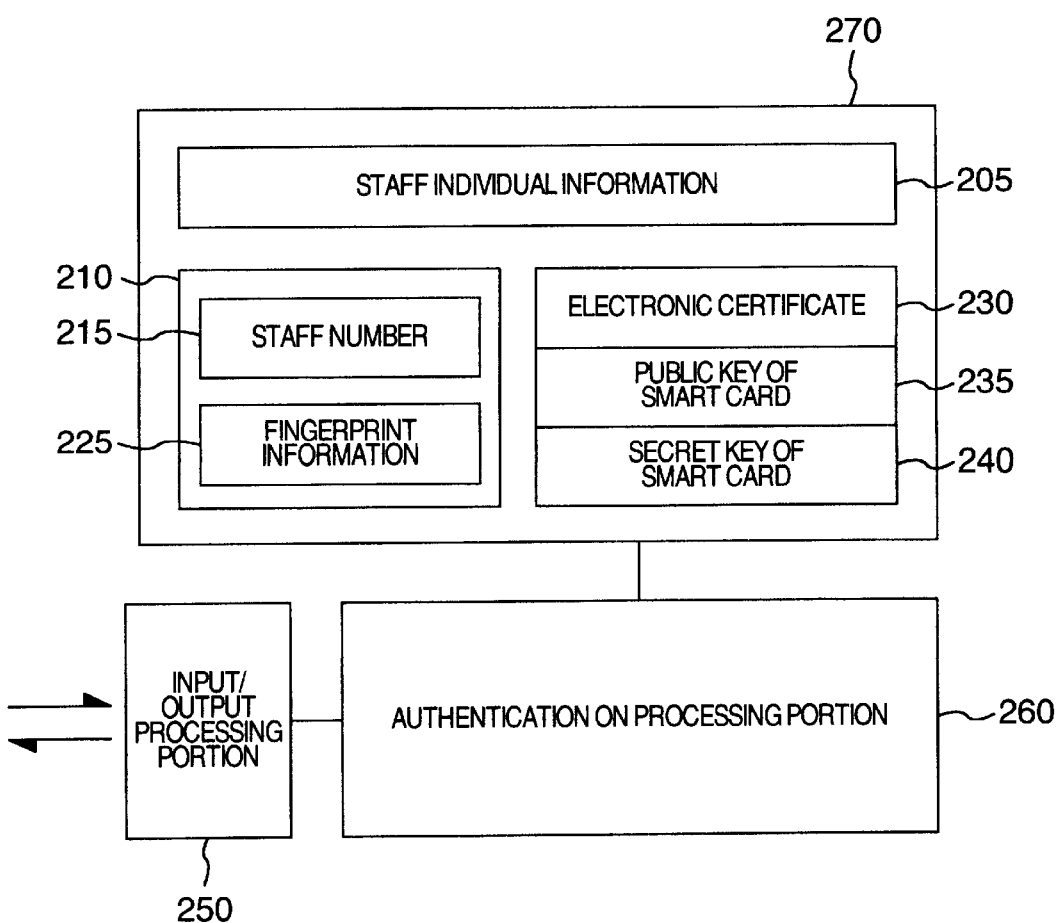
FIG. 2 is a block diagram showing the construction of a smart card.

FIG. 2 shows the construction of the smart card 200 and the information recorded in the smart card 200.

As shown in FIG. 2, the smart card 200 comprises a verification processing portion 250, an input/output processing portion 260 and a non-volatile storage portion 270. The non-volatile storage portion 270 stores staffs' personal information 205 such as the names and sections of staffs, staff information 210, an electronic certificate 230 given from a certificate authority to verify authenticity of the smart card, an open key 235 of the certificate authority, a secret key 240 inherent to each smart card and an open key 241 that forms a pair with the secret key 240. Here, the staff information 210 comprises a staff number 215 and fingerprint information 225 for discriminating the smart card of each staff. The certificate authority enciphers the open key 241 inherent to each smart card and the staff number 215 by its own secrete key and generates the electronic certificate. Incidentally, an ordinary smart card comprising a CPU and a memory can be used as the hardware construction of the smart card 200. In this case, the memory functions as the non-volatile storage portion 270 and CPU functions as processing units 250 and 260.

The security system having such a construction reads the staff information inclusive of the staff number and the fingerprint information from the smart card 200 carried by the staff when the staff enters the building 105, and stores temporarily these information in the temporary storage file 145 of the access management device 185. When the staff logs on to the terminal 165 or when the data base and the application of the host computer 150 are utilized, the security system reads the fingerprint of the staff by using the fingerprint input device (LS) 170, verifies it with the fingerprint information of the temporary storage file 145 and verifies the staff. When the staff leaves the building 105, the security system reads the staff number from the smart card 200 and erases the corresponding staff information from the temporary storage file 145.

Hereinafter, the operation will be explained in detail.

First, the processing when the staff enters the building 105 will be explained.

In this processing, the door management device 125 starts operating when the smart card reader/writer 120 recognizes the smart card 200. The staff can let the smart card reader/write 120 recognize the smart card 200, for example, as he holds up the smart card in front of the smart card reader/writer 120 when the smart card 200 is of a proximity type smart card.

Figure 3:
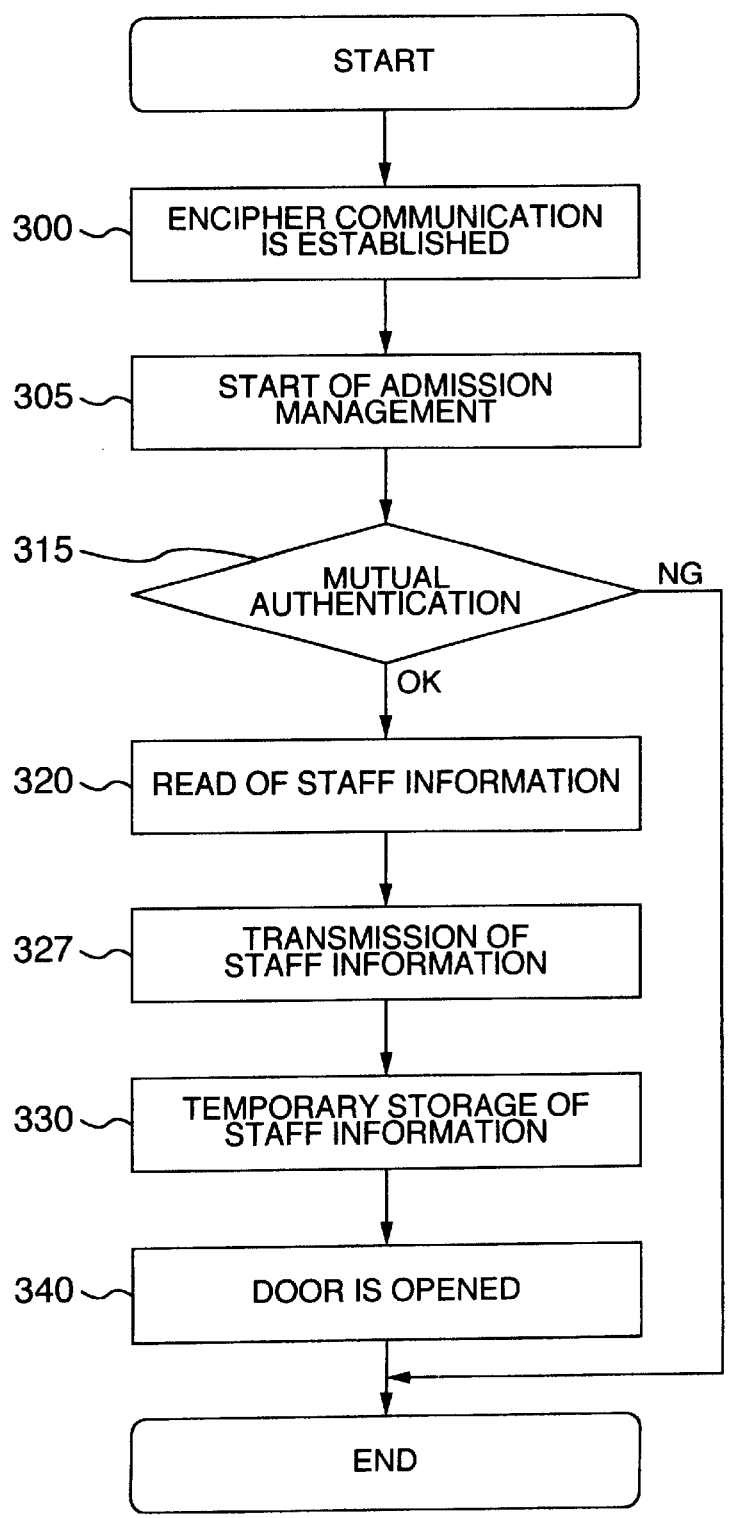
FIG. 3 is a flowchart showing a processing executed at the time of admission into a building.

FIG. 3 shows the procedure of this processing.

As shown in the drawing, when the processing is started, the door management device 125 establishes an encipher communication with the access management device 185 in step 300. This enables the access management device 185 and the door management device 125 to communicate with each other without wiretap and forgery. The method described in ANSI/ITU X.509, for example, can be used for this encipher communication.

In the next step 315, the door management device 125 and the smart card 200 execute mutual authentication. More concretely, the smart card and the door management device execute mutual authentication by the method described in ANSI/ITU X.509, or the like. First, a authentication processing portion 250 of the smart card 200 sends the staff number 215, the open key 230 and the electronic certificate 230 stored in the non-volatile storage portion 270 to the door management device 125. The door management device 125 deciphers the electronic certificate 230 by the open key of the certificate authority stored in advance, and acquires the open key and the staff number of the smart card. If these staff number and open key are in agreement with the staff number and the open key sent from the smart card 200, the door management device 125 generates an appropriate random number, executes enciphering by using the open key sent from the smart card 200 and sends it as challenge data to the smart card 200. The authentication processing portion 250 of the smart card 200 deciphers the challenge data by the secrete key 240 stored in the non-volatile storage portion 270 and returns the deciphering result as response data to the door management device 125. The door management device 125 verifies the random number generated some time before with the response data and verifies the smart card 200 as the authentic smart card if they coincide with each other. Next, the door management device 125 sends the electronic certificate, that the certificate authority enciphers and issues with its own secrete key, by using the door management device number stored in advance and the open key inherent to the door management device 125, on the contrary, to the smart card 200. The authentication processing portion 250 of the smart card 200 deciphers the electronic certificate by using the open key of the certificate authority that is stored in the non-volatile storage portion 270, and acquires the open key of the door management device 125 and the staff number. If the staff number and the open key so acquired are coincident with the staff number and the open key sent from the door management device 125, the authentication processing portion 250 generates a suitable random number, enciphers it by the open key sent from the door management device 25 and sends it as the challenge data to the door management device 125. The door management device 125 deciphers this data by its own secrete key stored in advance, and returns the deciphering result as the response data to the smart card 200. The authentication portion 250 of the smart card 200 verifies the random number generated previously with this random number and verifies the door management device as an authentic door management device when they coincide with each other.

When mutual authentication proves successful in this way, the door management device 125 reads the staff information 210 from the smart card 200 in step 320, and transmits the staff information 210 read in step 327 to the access management device 185. Receiving this staff information 210, the access management device 185 records the staff number 215 and the fingerprint information 220 that together constitute the staff information 210 so received, into the temporary storage file 145 in step 330 as shown in FIG. 4. It also records the staff number 215 and the admission of the staff to the log file 180.

Finally, the door management device 125 opens the door 130 and finishes the processing in step 340.

If mutual verification proves unsuccessful in step 315, on the other hand, the processing is as such finished.

Incidentally, in step 315 described above, not only the door management device 125 verifies the smart card 200 but the smart card 200 also verifies the door management device 125 for mutual authentication in order to prevent forgery of the smart card 200 by unauthentic devices. Therefore, if the smart card 200 is so insured as to be used for only the authentic door management device 125, only the door management device 125 may execute the processing for verifying the smart card 200 in place of mutual authentication.

Next, the processing required for the staff to log on to the terminal 165 will be explained.

The terminal 165 starts this operation when the staff demands log-on to the terminal 165.

Figure 5:
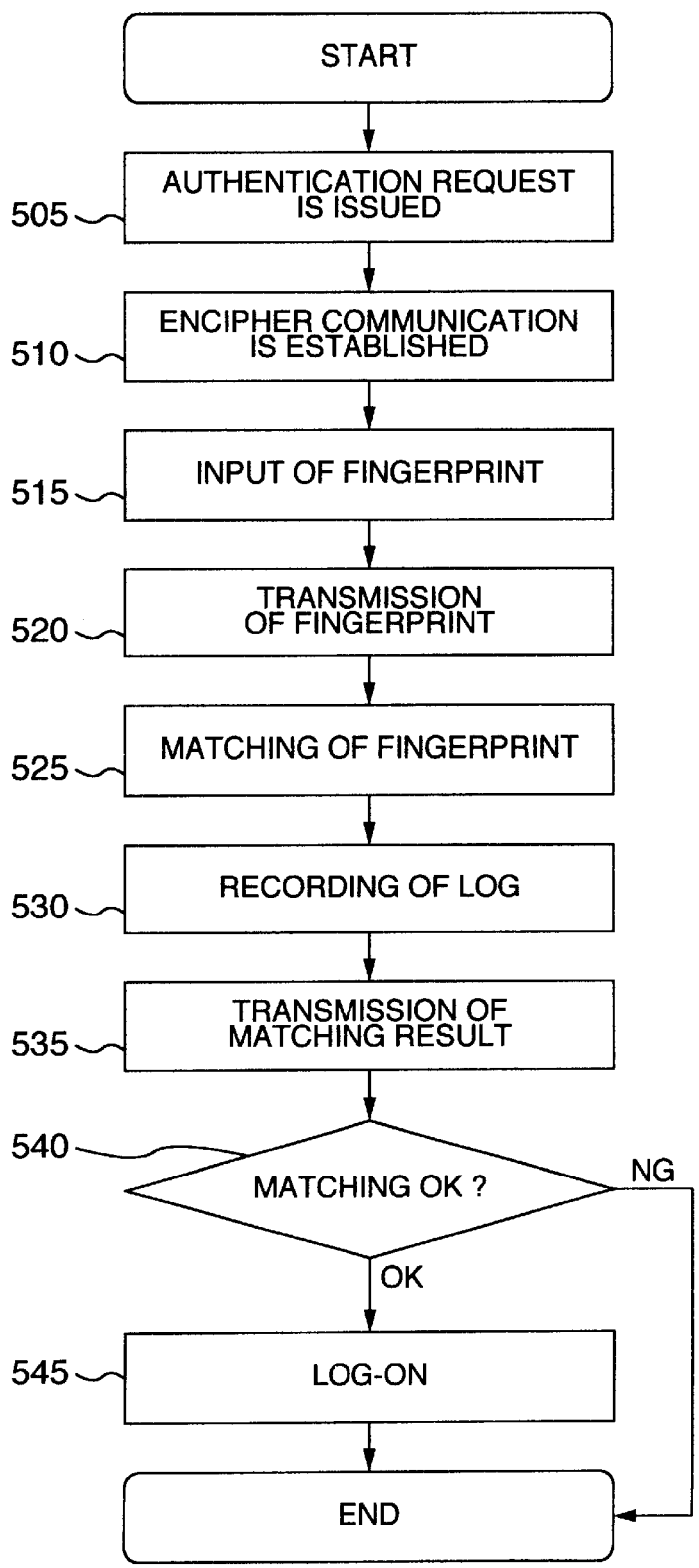
FIG. 5 is a flowchart showing a processing for logging on to a terminal.

FIG. 5 shows the procedure of this processing.

As shown in the drawing, the terminal 165 first generates a authentication request of the staff for the access management device in step 505. Next, the terminal 165 establishes encipher communication between the access management device and the terminal in step 510. The terminal 165 inputs the fingerprint of the staff from the fingerprint input device 170 connected to the terminal 165 in step 515, and transmits the inputted fingerprint to the access management device 185 in step 520.

Receiving the fingerprint, the access management device 185 verifies this fingerprint with the fingerprint recorded in the temporary file 145 in step 525. The access management device 185 outputs the code of the corresponding staff number when the coincident fingerprint exists in the temporary file 145, and outputs the code representing the verification failure when the coincident fingerprint does not exist. It records the verification result in the log file 180. The access management device 185 transmits the verification failure to the terminal 165 when the outputted code as the fingerprint verification result is the verification failure, and the verification success when the outputted code is the staff number, in step 535.

Receiving the fingerprint verification result, the terminal 165 finishes the processing in step 540 if the fingerprint verification result is the verification failure, or generates a suitable alarm.

Receiving the verification success as the fingerprint verification result, on the other hand, the terminal 165 allows the staff to log on to the terminal 165 in step 545.

Figure 6:
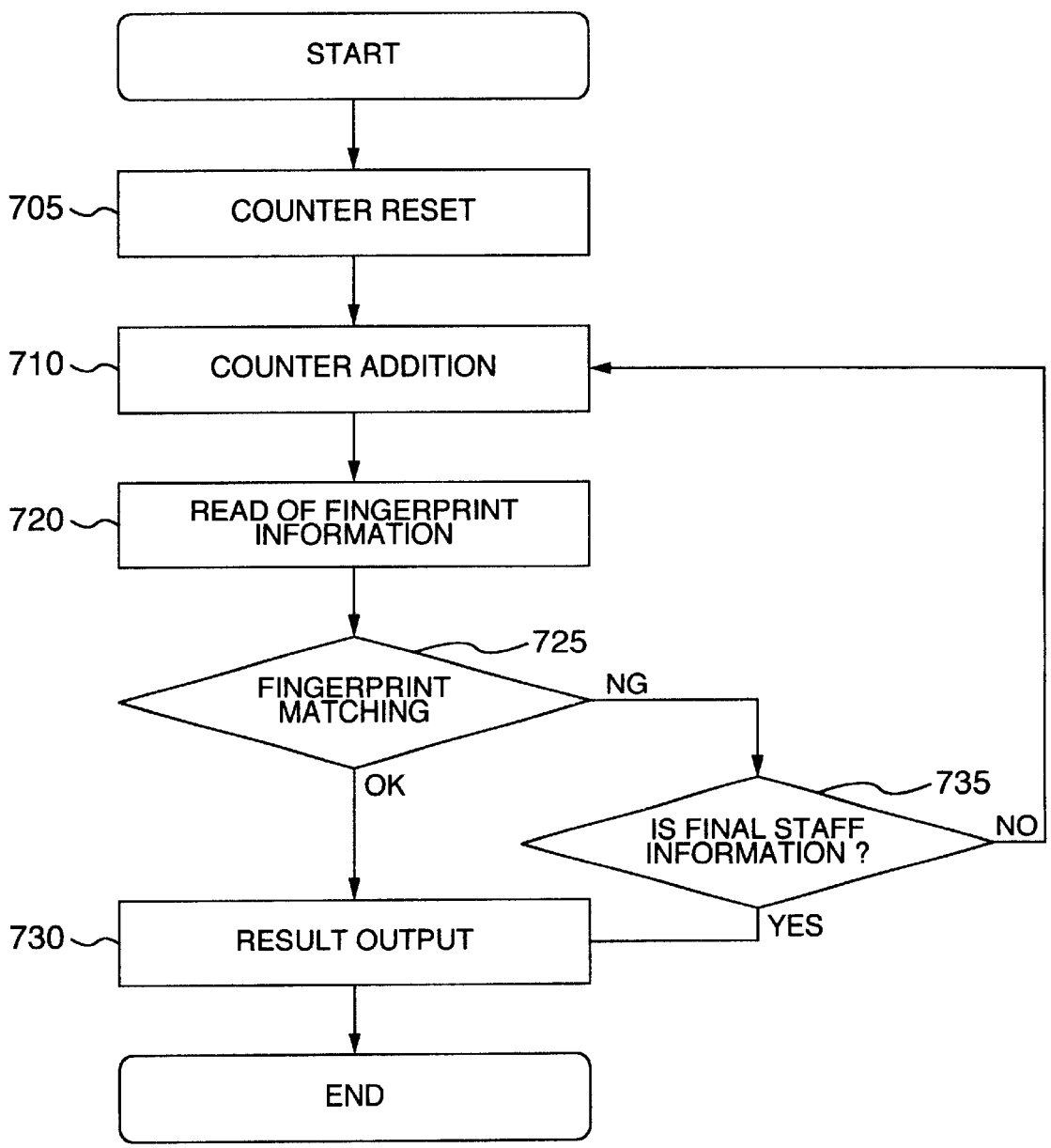
FIG. 6 is a flowchart showing a fingerprint verification processing.

Here, the access management device 185 executes the fingerprint verification processing in step 525 in FIG. 5 in accordance with the procedure shown in FIG. 6, for example.

First, a counter that represents the number of the staff information stored in the temporary storage file is reset to 0 in step 705. Next, 1 is added to the counter in step 710.

In step 720, the fingerprint information of the staff information indicated by the counter is read from the temporary storage file. The fingerprint information and the fingerprint sent from the terminal are verified. When they are coincident, the staff number corresponding to the coincident fingerprint information is set to the result code as the fingerprint verification result, and the flow proceeds to step 730. When they are not coincident, the flow branches to step 735.

When the counter represents the number of the staff information of the last staff in step 735, the result code is set to the verification failure, and the flow branches to step 730. When the staff is not the last staff, the flow returns to step 710.

In step 730, the code obtained in step 725 or in step 735 is outputted.

Next, the processing when the staff enters the computer room 110 will be explained.

The processing in this case is substantially the same as the operation when the staff requests log-on to the computer system from the terminal 165 shown in FIGS. 5 and 6. However, the authentication request in step 505 in FIG. 5 is issued from the internal door management device 155 to the access management device 185. In step 54 in FIG. 5, further, the fingerprint verification result is transmitted from the access management device 185 to the internal door management device 155. In step 545 in FIG. 5, the internal door management device 155 permits or rejects the admission of the staff to the computer room 110 in accordance with the fingerprint verification result. In other words, when the fingerprint verification result is the verification failure, the internal door 140 is not opened. When the fingerprint verification result is the verification success, the internal door 140 is opened.

Next, the processing required for the staff to utilize the database and the application of the host computer 150 is explained.

The processing in this case is substantially the same as the processing when the staff requests log-on to the computer system from the terminal 165 shown in FIGS. 5 and 6. However, the verification request in step 505 in FIG. 5 is issued from the host computer 150 to the access management device 185.

In step 535 in FIG. 5, the fingerprint verification result is transmitted from the access management device 185 to the host computer 150. In step 545 in FIG. 5, the host computer permits or rejects utilization of the application and the database in accordance with the fingerprint verification result. In other words, the host computer permits the utilization when the fingerprint verification result proves the verification failure, and rejects the utilization when it receives the verification success as the fingerprint verification result.

Next, the processing required for the staff to leave the building 105 is explained.

In this processing, the door management device 125 starts operating when the smart card reader/writer 121 recognizes the smart card 200.

Figure 7:
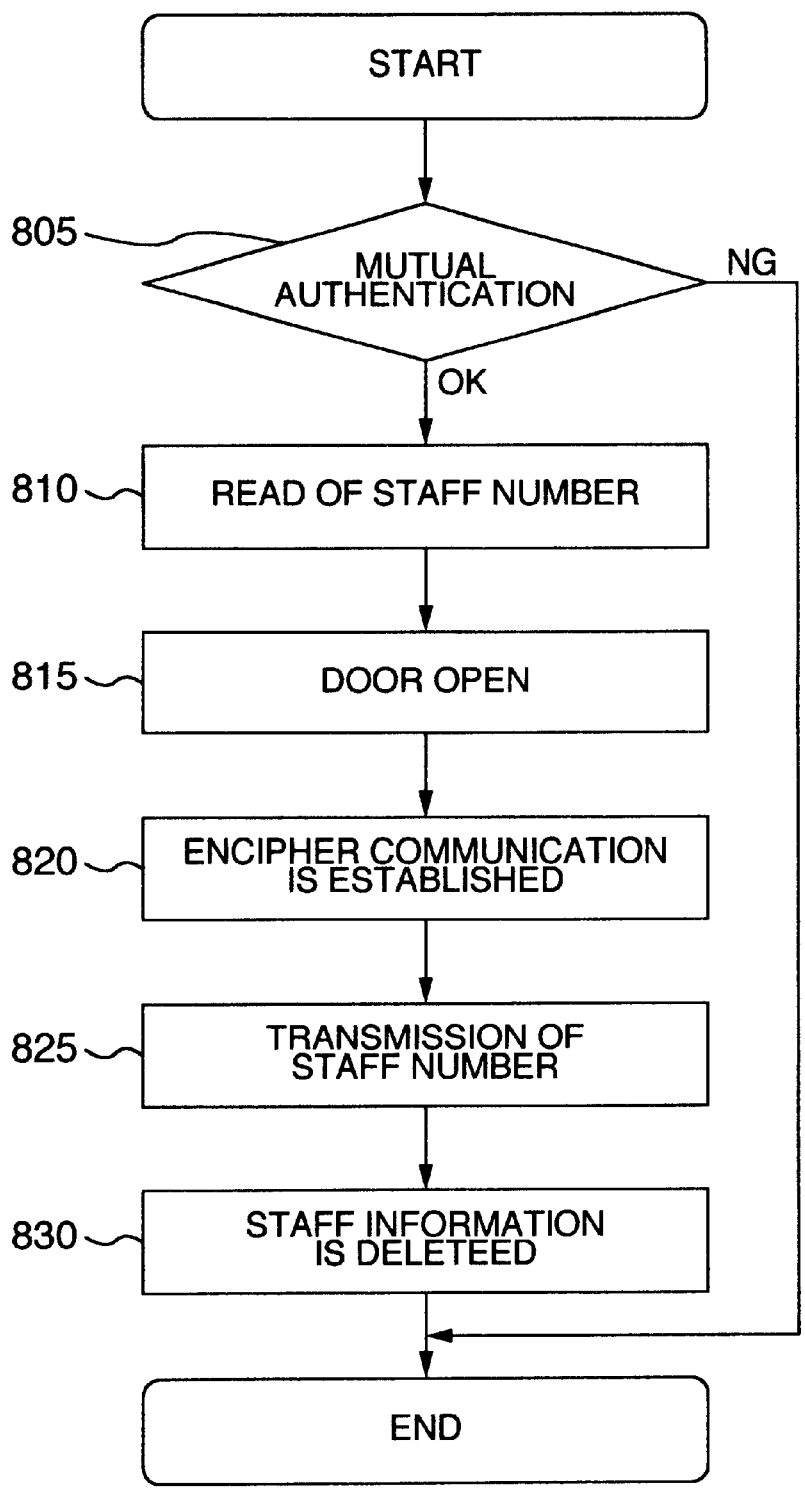
FIG. 7 is a flowchart showing a processing for leaving a building.

FIG. 7 shows the procedure of this processing.

As shown in FIG. 7, the door management device 125 first executes mutual authentication with the smart card 200 in the way described already in step 805. When mutual authentication proves successful, the door management device 125 reads the staff number 215 from the smart card 200 in step 810. The door management device 125 opens the door 130 and allows the staff to leave in step 815. When authentication proves unsuccessful, the door management device 125 executes a predetermined abnormality processing such as generation of an alarm.

When mutual authentication proves successful, the door management device 125 establishes encipher communication with the access management device 185 in step 820 and transmits the staff number read previously to the access management device 185 in step 825.

Receiving the staff number, the access management device 185 deletes the staff information corresponding to the staff number it receives, that is, the staff number and the fingerprint information, from the temporary storage file 145 in step 830, and records leaving of the staff into the log file 189.

In each processing described above, the access management device 185 recognizes the entry/leaving of the staff into and from the building 105 and the computer room, log on/off to the terminal 165 and the utilization state of the application and the database of the host computer 150 on the basis of the information reported thereto from each device, and builds up the history in the log file 180 as shown in FIG. 8. However, the access management device 185 cannot recognize the finish of utilization of the application and the database of the host computer 150 and log-off from the terminal 165 on the basis of only the information reported thereto during each processing. Therefore, the host computer 150 and the terminal 165 report log-off of the staff from the terminal 165 and the finish of utilization of the database, etc, to the access management device 185.

The above explains the first embodiment of the present invention.

Incidentally, in the processing of the embodiment shown in FIG. 5, the fingerprint inputted by the terminal 165 is transmitted to the access management device 185, and the access management device 185 verifies this fingerprint with the fingerprint information stored in the temporary storage file 145. However, this procedure may be changed as follows. The staff requesting log-on inputs the staff number by the terminal 165, and the fingerprint information of this staff number is read from the access management device 185. The terminal 165 then verifies the fingerprint information with the staff's fingerprint.

Figure 9:
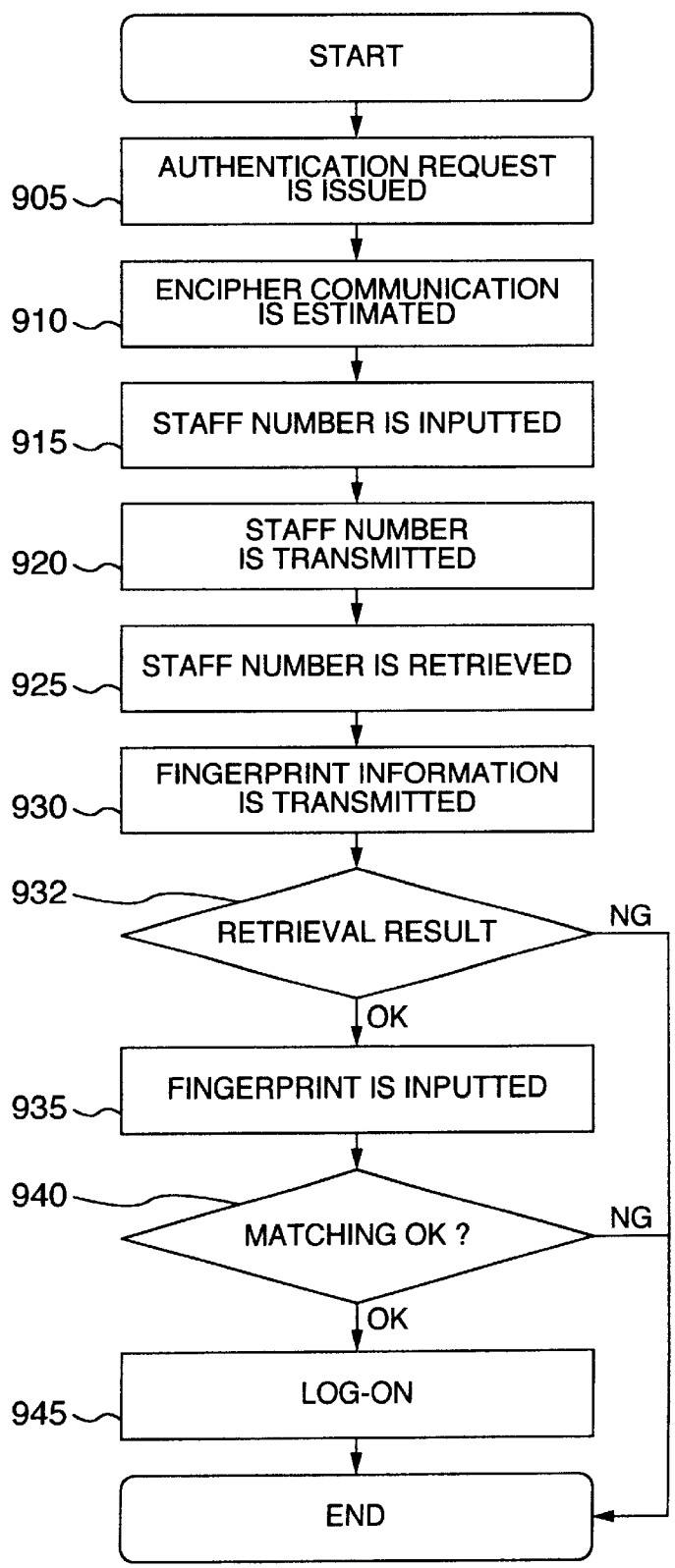
FIG. 9 is a flowchart showing a processing for logging on to a terminal.

In the procedure shown in FIG. 9, the terminal 165 first generates the authentication request to the access management device 185 in step 905 and then establishes the encipher communication with the access management device 185 in step 910. The terminal 165 accepts the input of the staff number in step 915 and transmits the staff number to the access management device 185 in step 920.

The access management device 185 retrieves whether or not the corresponding staff number exists in the temporary storage file 145 in step 925, and sends the fingerprint information corresponding to the staff number to the terminal 165 in step 930. When the corresponding staff number does not exist, the access management device 185 sends to the terminal 165 the report that no corresponding staff number exists.

Receiving the report of no corresponding staff in step 932, the terminal 165 finishes the processing, or executes an appropriate processing such as generation of an alarm.

When receiving the fingerprint information, on the other hand, the terminal 165 inputs the fingerprint of the staff by the fingerprint input device 170 in step 935 and verifies the fingerprint inputted in step 940 with the fingerprint information received from the access management device 185. The terminal 165 finishes the processing when verification proves unsuccessful, and permits log-on of the staff in step 945 when verification proves successful.

In the embodiment described above, the door 130 is opened and the staff is allowed to enter in the processing shown in FIG. 3 when mutual authentication is successful between the smart card 200 and the door management device 125. However, it is also possible to employ the following construction. A fingerprint input device is disposed outside the door 130 of the building 105, and the step 315 shown in FIG. 3 is replaced by the procedure shown in FIG. 10. The fingerprint inputted by the fingerprint input device is then verified with the fingerprint information recorded in the smart card 200. The door 130 is opened and the staff is allowed to enter only when verification proves successful.

Figure 10:
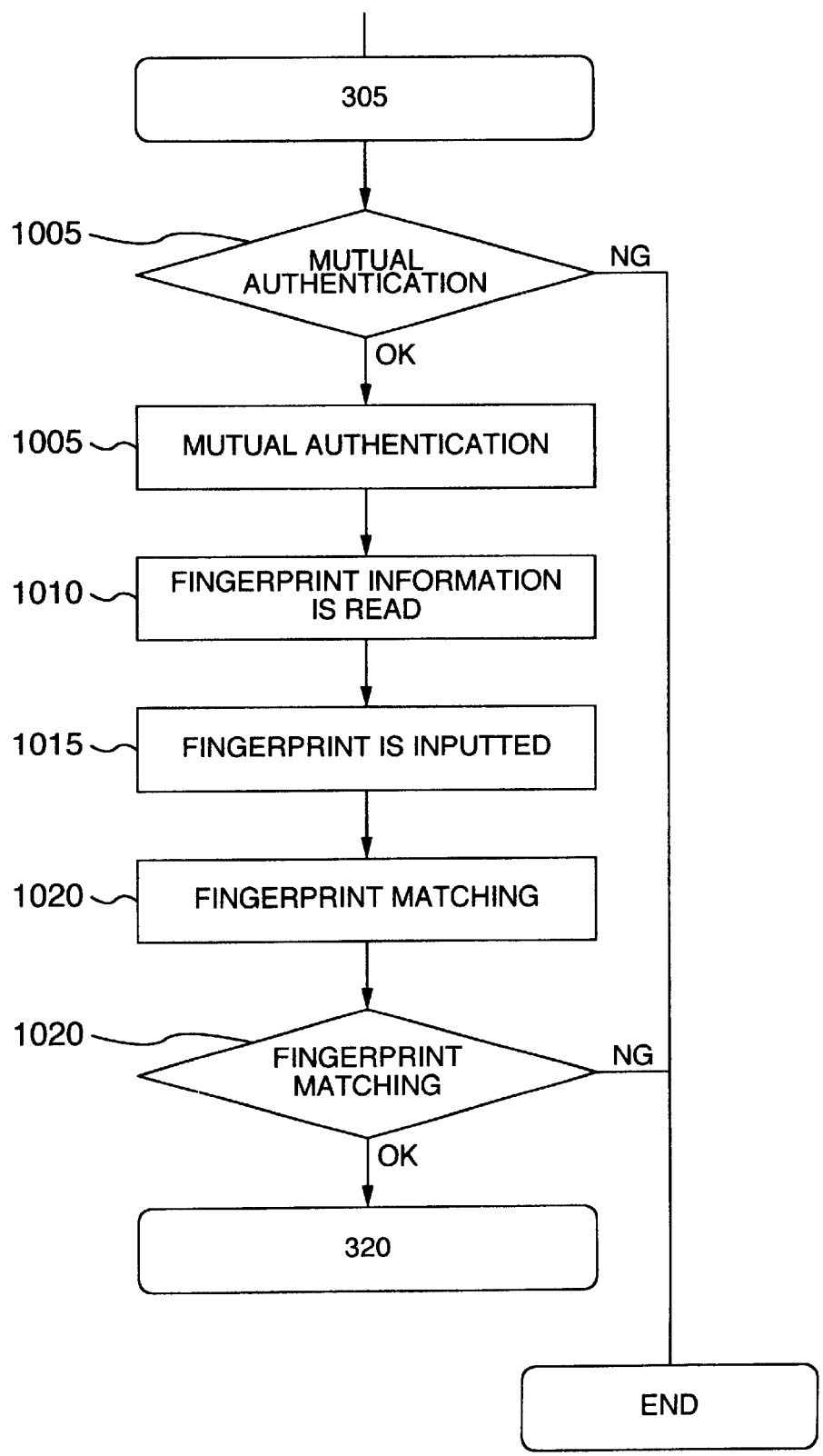
FIG. 10 is a flowchart showing a fingerprint verification processing for entering a building.

In the procedure shown in FIG. 10, the door management device 125 first executes mutual authentication with the smart card 200 in step 1005, and finishes the processing shown in FIG. 3 when mutual verification proves unsuccessful. When it proves successful, the fingerprint information 225 is read from the smart card 200 in step 1010. The door management device 125 inputs the fingerprint from the fingerprint input device disposed in the building 105 and verifies the inputted fingerprint with the read fingerprint information. When they do not coincide, the processing shown in FIG. 3 is finished, and when they do, the flow proceeds to the step 320 shown in FIG. 3.

Incidentally, the procedure shown in FIG. 10 may be revised in such a fashion that the door management device 125 transmits the fingerprint information read from the smart card and the inputted fingerprint to the access management device 185 and the access management device 185 in turn verifies them and sends the verification result to the door management device 124.

Furthermore, mutual verification at the time of leaving of the staff in step 805 in FIG. 7 may be so revised as to execute the same processing as that of FIG. 10.

In the embodiment described above, it is also possible to add access right information representing the access destination, to which the staff can gain access, to the staff information of the smart card 200, to store this information in the temporary storage file 145 of the access management device 185 in the same way as the fingerprint information, and to conduct the access management in accordance with this access right of each staff. When the staff information is recorded into the temporary storage file 145 in the access management device 185, it is also possible to set the term of validity of the staff information, to discard the fingerprint information the term of validity of which expires at present and to delete it from the temporary storage file. In consequence, even when the staff leaves the building from an unfair exit, that is, from the exit that is outside the range of the management, it becomes possible to prevent the staff information from being kept stored in the temporary storage file 145.

These access right information and validity term may be stored in, and managed by, the temporary storage file together with the staff number and the fingerprint information. Incidentally, the access right of each staff may be stored in the access management device 185 in place of the smart card 200.

In the embodiment described above, a decision parameter for judging coincidence/non-coincidence between the fingerprint and the fingerprint information may be disposed in step 725, etc, in FIG. 6 so that an error of rejecting erroneously an authentic staff (false rejection rate) or an error of accepting erroneously unauthentic staff (false acceptance rate) can be decreased as this decision parameter is changed.

Figures 11, 12:
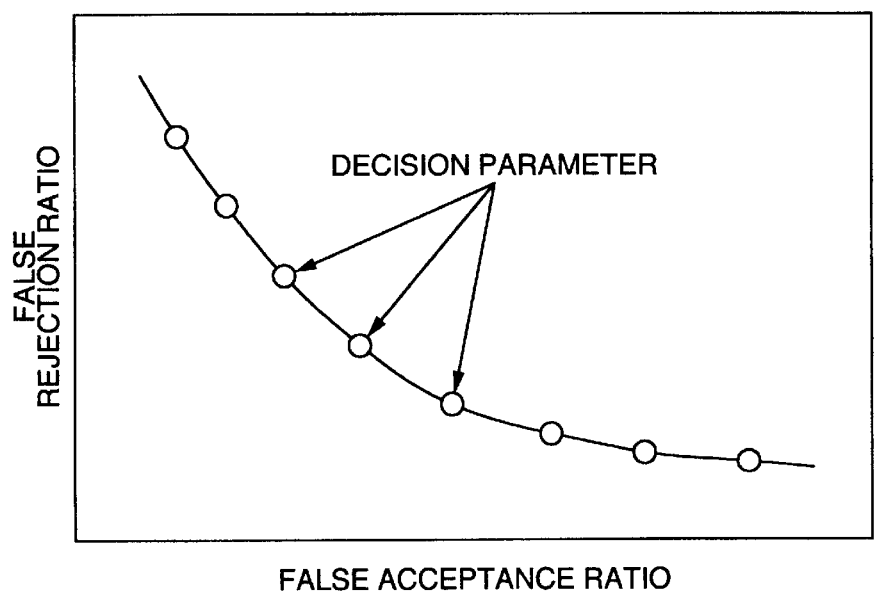
FIG. 11 is a table showing the content of a temporary storage file.
FIG. 12 is a graph showing the relationship between a decision parameter and a verification error.

Here, FIG. 12 shows an ordinary relationship between the false rejection rate and the false acceptance rate when the decision parameter is changed. The decision parameter may be changed in accordance with the staff, the security level of the terminal, the environment such as the season, the temperature, the moisture, etc, and the combination of a password with other authentic staff verification means. The decision parameter may be recorded in advance in the access management device 185 as a table of decision parameters shown in FIGS. 13, 14, 15 and 16. In examples shown in the drawings, the decision parameters are changed in accordance with the staff, the security level of the database of the host computer, the environment and other authentic staff verification means used in combination, respectively. Each table represents that the fingerprint and the fingerprint information are regarded as coincident when the numeric values of the verification parameters in each table reach the respective values.

Figures 16, 17:
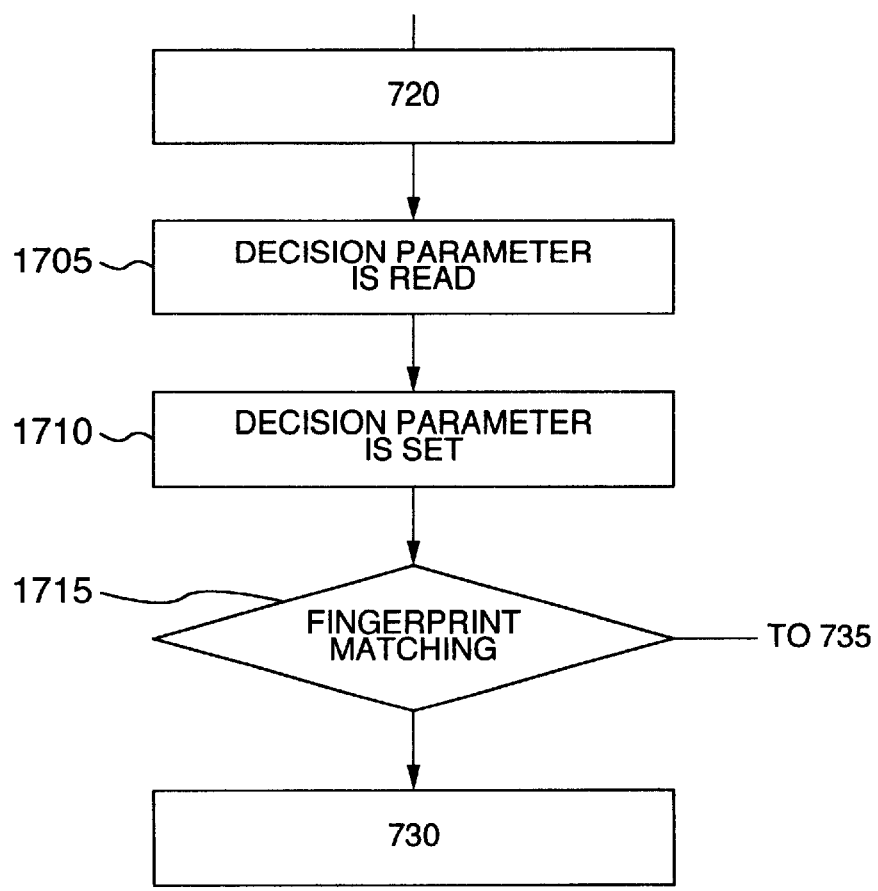
FIG. 16 is a table showing another decision parameter set for each correct person verification means that is to be used in combination.
FIG. 17 is a flowchart showing a processing for fingerprints verification by using a decision parameter.

When such a decision parameter is used, the procedure of fingerprint verification in step 725 shown in FIG. 7 can be materialized by the procedure shown in FIG. 17, and so forth.

The access management device 185 reads first the table of the decision parameters in step 1705, and sets the staff as the object, the security level of the database as the object of utilization, the present environment, other authentic staff verification means to be combined with fingerprint verification and the verification parameters used for judgment from the table of the decision parameters. The access management device 185 judges coincidence/non-coincidence in accordance with the degree of matching of the verification parameters, the fingerprint and the fingerprint information.

In the embodiment described above, an electronic signature may be added to the fingerprint information to be recorded in the smart card 200 in accordance with the technology described in JP-A-11-16628 in order to prevent forgery of the fingerprint information by verifying the electronic signature at the time of fingerprint verification.

In this case, it is possible to employ a method that first verifies the electronic signature at the time of the entry of the staff into the building 105 and when verification proves successful, to skip verification of the electronic signature at the time of fingerprint verification.

This embodiment verifies the authentic staff by using the fingerprint, but biometric information other than the fingerprint may also be used. Other arbitrary information may be used in place of the biometric information so long as an authentic user can carry such information and an unauthentic user cannot. For example, the authentic user can keep in mind the combination of the staff number with the password whereas the unauthentic user cannot keep such a combination.

Other suitable memory medium can be used in place of the smart card 200.

According to the present embodiment described above, the access management device 185 holds the staff information such as the fingerprint information only while the user exists inside the security zone. Therefore, this embodiment can prevent a large number of staff information from being stolen at one time.

The smart card is used only at the time of entry/leaving into and out from the security zone. Therefore, the smart card reader need not be disposed to each terminal 165, and the system configuration cost can be made more economical.

This embodiment can prevent the unauthentic action by the person entering unauthentically the security zone to the security object inside the security zone.

Since this embodiment can insure that the biometric information of the user such as the fingerprint information is persistently held in only the smart card, this embodiment can mitigate the negative feeling of the users.

Since the history of entry/leaving of the user and the access to the computer system is recorded, the unauthentic action, if any, can be traced easily.

Next, the second embodiment of the present invention, that is directed to insure security of security objects (such as computer systems) inside a security zone extending to a plurality of zones (such as branch offices) is explained.

Figure 18:
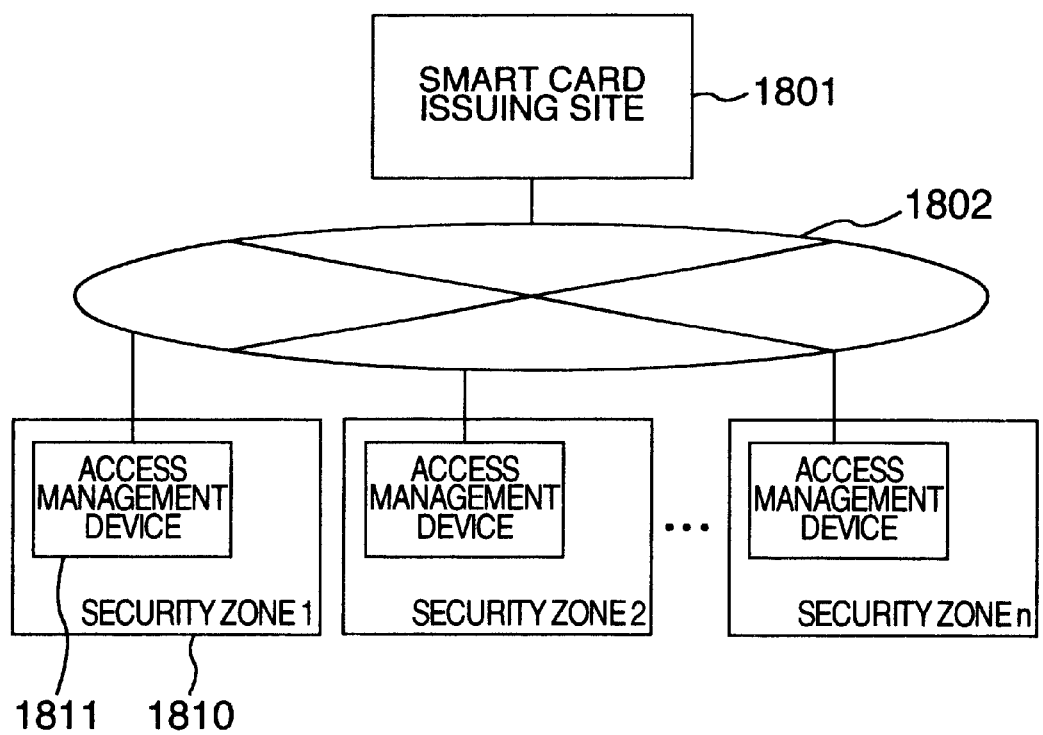
FIG. 18 is a block diagram showing the overall construction of a security system wherein security zones spread in a plurality of zones, according to the second embodiment of the present invention.

FIG. 18 shows the overall construction of the security system for guaranteeing security of security objects inside a security zone that extends to a plurality of zones.

As shown in the drawing, the security system comprises a smart card issuing site 1801 for issuing a smart card that has registered information such as staff information inclusive of biometric information of this invention, and a plurality of security zones 1810 in which staffs having the smart card work. The smart card issuing site and an access management device 1811 in each security zone are connected by a dedicated line or public information transmission means 1802.

Figure 19:
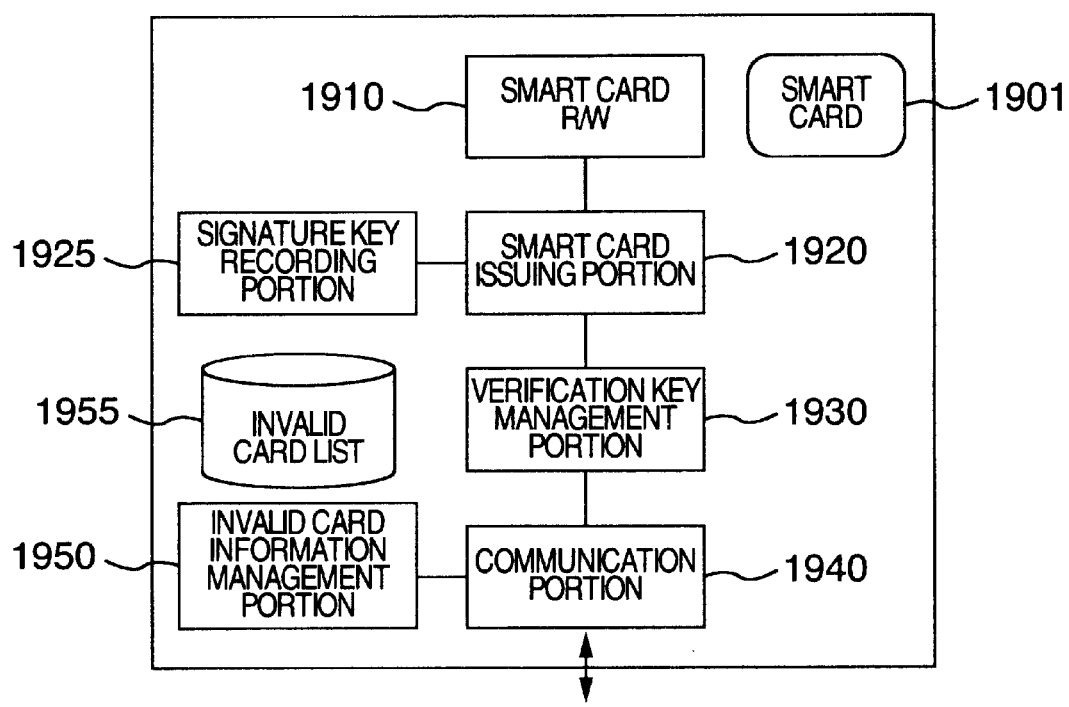
FIG. 19 is a block diagram showing a functional construction of a smart card-issuing site in the second embodiment.

FIG. 19 shows a functional structural view of the smart card issuing site.

As shown in this drawing, the smart card issuing site comprises a smart card issuing portion 1920 having a smart card R/W 1910, a signature key recording portion 1925 comprising a device having a tamper-resistance, a verification key management portion 1930 for managing a verification key for deciphering a digital signature by the signature key, an invalid card information management portion 1950 for managing a list 1955 of cards that have become invalid among those which have been issued already, and a communication portion 1940 for transmitting the verification key information and the invalid card information to each security zone.

Figure 20:
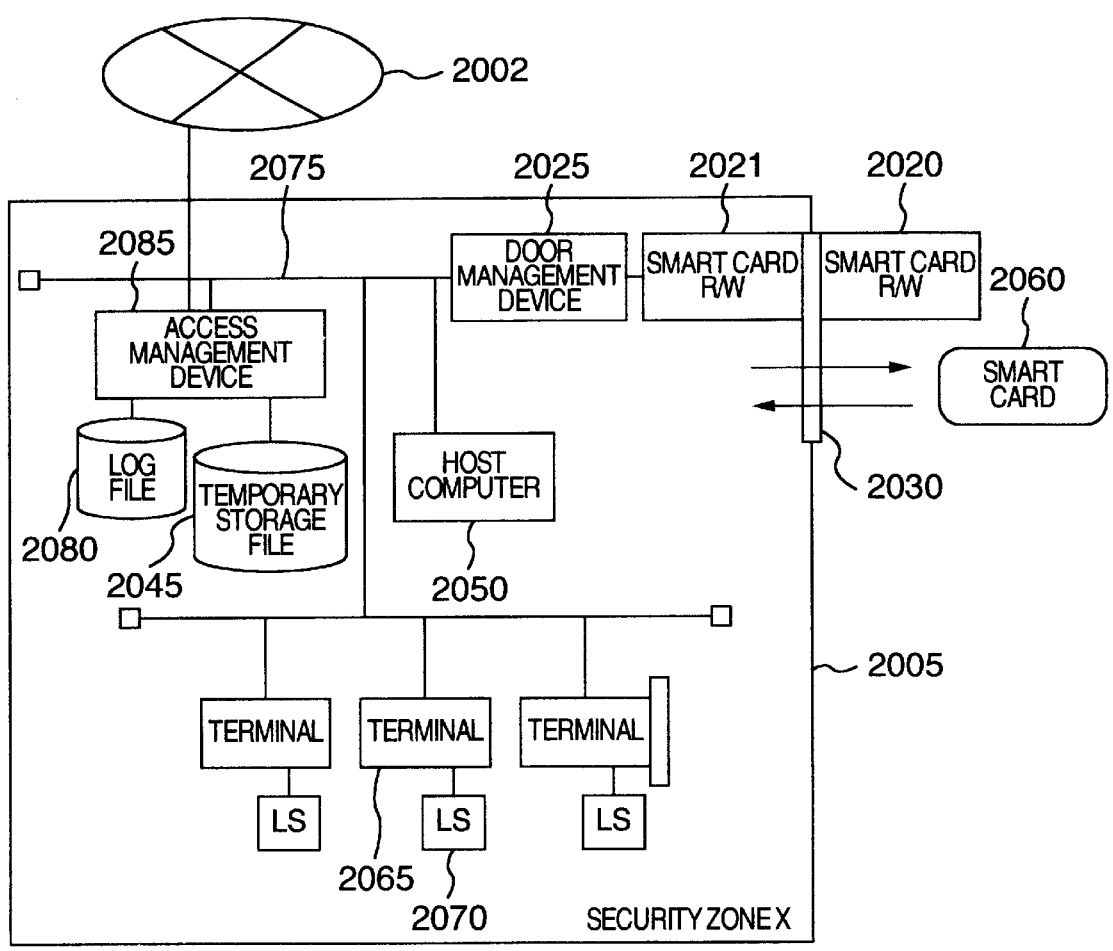
FIG. 20 is a block diagram showing a device construction of each security zone according to the second embodiment.

FIG. 20 shows a device structural view in each security zone.

As shown in the drawing, a computer system comprising a host computer 2050 and a terminal 2065 as the security object in this security system is installed inside the security zone 2005 which is cut off by a door 2030 and the admission to which is permitted to only those staffs to whom the smart card is issued in advance. The host computer 2050 provides a database that records information having high secrecy and business applications. A plurality of terminals 2065 is installed to utilize the resources of the host computer 2050. A fingerprint input device 2070 is provided to each terminal 2065.

The security system of this embodiment comprises a door management device 2025 for controlling opening/closing of the door 2030 of the security zone 2005, a smart card reader 2020 disposed outside the door 2030, a smart card reader 2021 disposed inside the door 2030, and an access management device 185 equipped with a temporary storage file 2045 and a log file 2080 and connected to the dedicated line 2002 that is in turn connected to the smart card issuing site.

Figure 21:
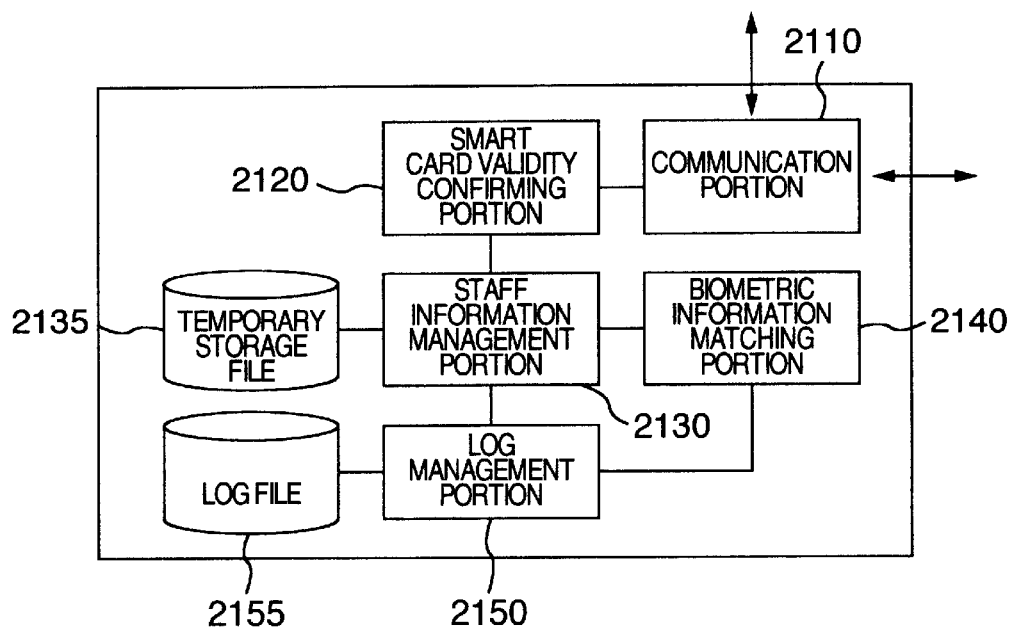
FIG. 21 is a block diagram showing a device construction of each security zone according to the second embodiment.

FIG. 21 shows a functional structural view of the access management device.

As shown in this drawing, the access management device comprises a communication portion 2110 for managing communication between each device inside the security zone and the smart card issuing site, a smart card validity confirmation portion 2120 for confirming validity of the smart card, a staff information management portion 2130 equipped with a temporary storage file 2135, a biometric information verification portion 2140, and a log management portion 2150 equipped with a log file 2155 and managing the verification log.

Figure 22:
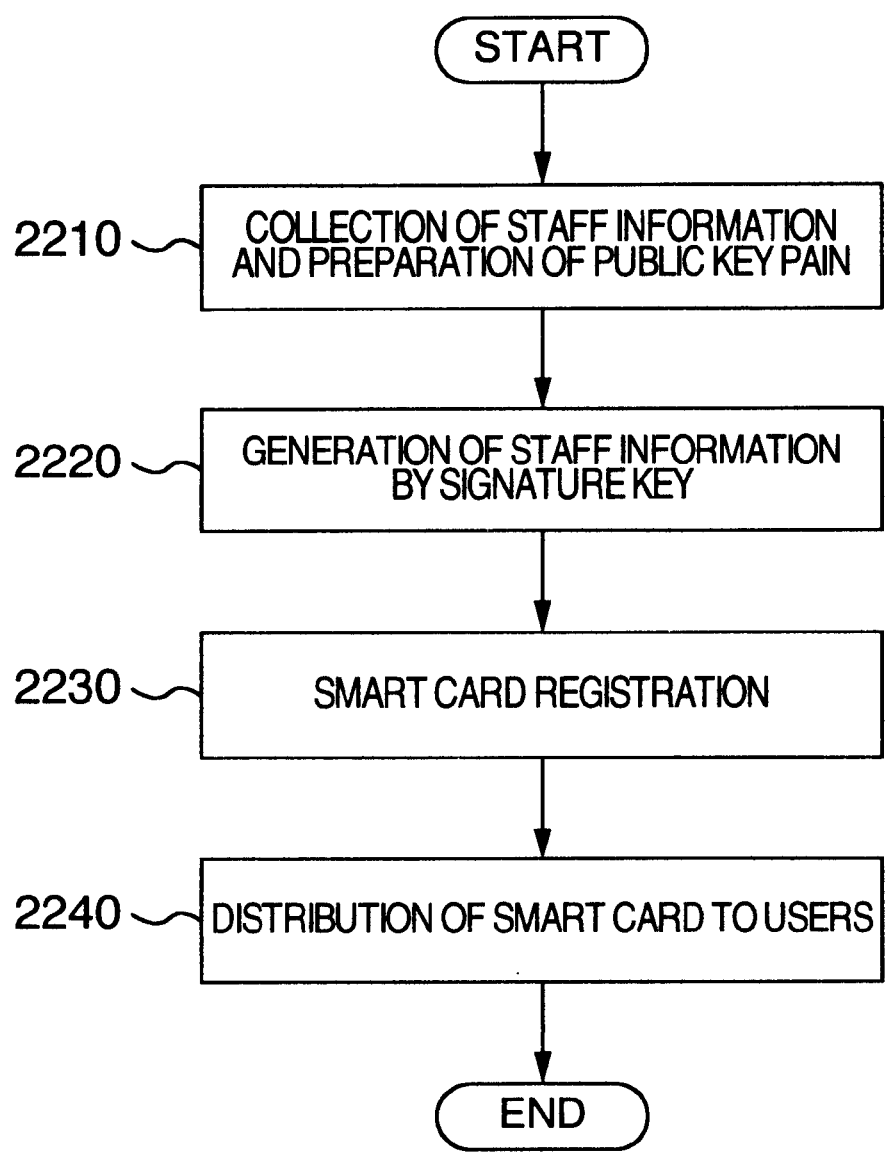
FIG. 22 is a flowchart showing a smart cardissuing processing according to the second embodiment.

FIG. 22 shows a smart card issuance flow that is executed in the smart card issuing site.

Step 2210

This step collects the staff information of the staff for which the smart card is issued, generates a verification key/signature key pair, and receives a certificate for the verification key.

Here, the verification key/signature key uses concretely an open encipher key technology such as an RSA system or an elliptic encipher system. An open key is applied to the verification key and a secret key, to the signature key.

The staff information to be collected is listed below. In collecting the information, high security is necessary lest forgery, tampering, etc, are conducted. The verification key and the secrete key are generated in some cases inside the smart card in order to secure secrecy of the signature key.

ID information (certificate serial number of open key, staff number, name, date of birth, etc.).

Business information (section, position, authority, date of joining company, etc.).

Biometric information

Step 2220

Signatures of whole staff information are generated by using the signature key.

The signature result is obtained in the following way. A message digest is first prepared for all the staff information using a predetermined message digest function, and the resulting message digest is enciphered by using the signature key of the smart card issuing site.

Step 2230

The staff information and the certificate collected in step 2210 and the signature result obtained in step 2220 are registered to the smart card.

Step 2240

The smart card of step 2230 is distributed to the corresponding user.

To insure the distribution of the user satisfying the staff information registered to the smart card, a registered mail is utilized in some cases.

Figure 23:
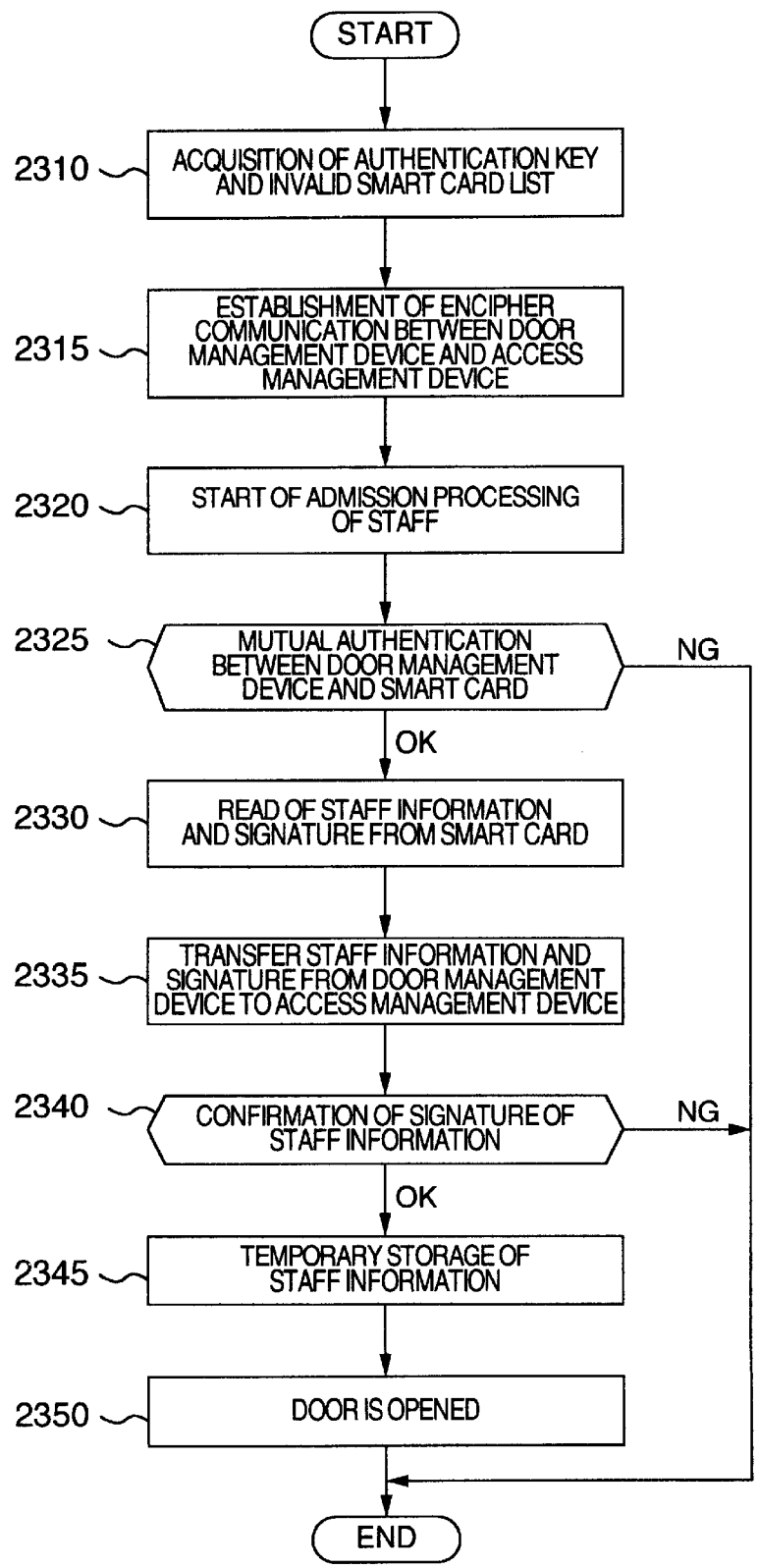
FIG. 23 is a flowchart showing an admission processing to each security zone according to the second embodiment.

FIG. 23 shows an admission flowchart into each security zone.

Step 2310

A verification key for confirming authenticity of the registration information of the smart card and an invalid smart card list are acquired.

Here, acquisition of the verification key and the invalid smart card list is done through a network such as the dedicated line or an encipher communication (mail), and authenticity of the information is confirmed.

This processing is conducted periodically (every day or every night) to acquire the latest invalid smart card list.

The invalid smart card list lists up those smart cards which have become invalid due to resignation, movement, etc, of the staffs or due to the loss or theft, and have not yet been recovered by the smart card issuing site among the smart cards that the smart card issuing site has issued for the users. It is possible to limit from this list the unrecovered smart cards that have not yet been rendered invalid because of the term of validity so long as the smart cards have the term of validity.

Step 2315

Encipher communication is established between the door management device and the access management device. More concretely, the method shown in FIG. 3 is employed.

Step 2320

An admission processing of the staffs is commenced.

Step 2325

The door management device executes mutual authentication with the smart card. More concretely, the method shown in FIG. 3 is employed. When authenticity of the smart card is not confirmed by this mutual verification, the admission processing is finished. When the smart card is verified as the authentic smart card, the flow proceeds to step 2330.

Step 2330

The door management device reads the staff information and the signature information from the smart card.

Step 2335

The staff information and the signature information read in step 2330 are transferred to the access management device.

Step 2340

The access management device confirms authenticity of the staff information with the verification key acquired in step 2310. More concretely, the message digest is prepared for the staff information by the same method as that of step 2220, and the signature information is verified with deciphering result by the verification key. If they are coincident, authenticity can be confirmed.

If authenticity cannot be confirmed, the admission processing is finished. If authenticity of the staff information can be confirmed, the flow proceeds to step 2345.

Step 2345

The access management device records the staff information to the temporary storage file. It records the staff number and the entry of the staff to the log file.

Step 2350

The door management device opens the door, and the admission processing is finished.

Log-in by the staff to the terminal is conducted in accordance with the procedure shown in FIGS. 5 and 6.

A leaving processing of the staff is conducted in accordance with the procedure shown in FIG. 7.

As described above, access to the security objects in a plurality of security zones is permitted to only those users who have the smart card and have entered the security zone through the normal procedure. The present system can be applied to financial, security and insurance fields having a plurality of branches and dealing with the secret information and ordinary business firms. The present system can promote mobilization of staffs among the branches and can exploit fully the human resources with a high level of security.

The present system can be applied also to each floor of a so-called tenant buildings in which a different business firm occupies each floor and which indefinite users can enter and leave freely. When the present system is applied to each floor in match with the security level of each business firm occupying the floor of such a tenant building, high security can be secured at a relatively low cost even when the business firm occupies a plurality of floors.

The above explains the second embodiment of the present invention.

Figure 24:
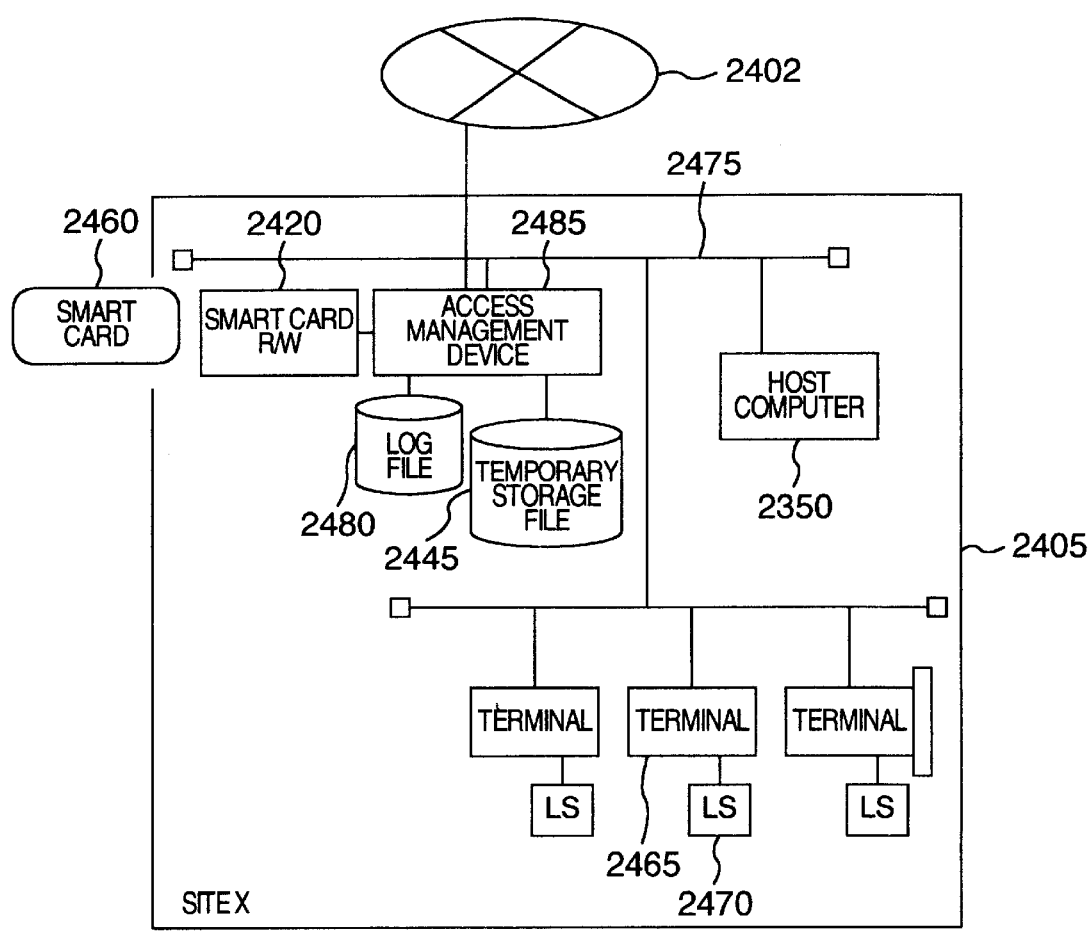
FIG. 24 is a block diagram showing a device construction at each position when a security zone covers a plurality of positions.

FIG. 24 shows a modified embodiment of the embodiment described above, which omits the limiting function of entry/leaving for each security zone shown in FIG. 20 and which is directed to only the access to the security object.

As shown in the drawing, the door management device operating in the interlocking arrangement with the smart card at the time of entry/leaving of each site is omitted, and an access management device 2485 equipped with a temporary storage file 2445 having a smart card reader 2420 and a log file 2380 are installed instead.

Here, the access management device 2485 has the function of managing the entry/leaving of the staff. The staff presents the smart card 2460 to the card reader 2420 of the access management device 2485 at the time of attendance. After authenticity of the smart card 2460 and the staff information is confirmed, the staff information is recorded to the temporary storage file 2445. When leaving, the staff similarly presents the smart card 2460 to the card reader 2420 of the access management device, and the staff information of this staff is deleted from the temporary storage file 2445.

Figure 25:
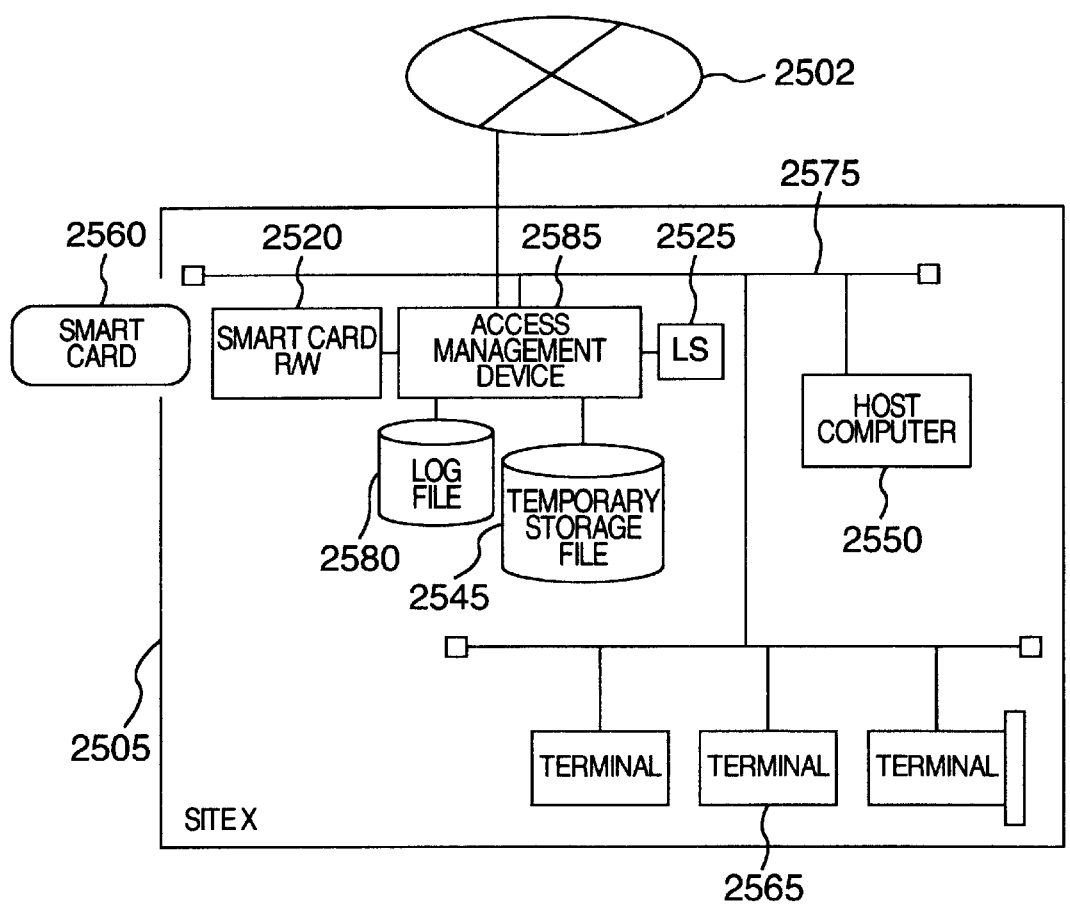
FIG. 25 is a block diagram showing a device construction at each position that is directed to reduce the cost of user registration in the second embodiment.

FIG. 25 shows still another modified embodiment that is directed to the management of the access right of the staff information.

As shown in the drawing, the door management device operating in the interlocking arrangement with the smart card at the time of entry/leaving is omitted in the same way as in FIG. 24. A smart card reader 2520 and an access management device 2585, that has a temporary storage file 2545 including a biometric information input device 2525 (a fingerprint input device, for example), and a log file 2580, are provided instead. The biometric information input device provided to the terminal is omitted, too, and individual authentication information such as a password is provided to the staff information.

Here, the staff dispatched from other site presents his smart card to the smart card reader 2520 connected to the access management device 2585. The access management device 2585 confirms authenticity of the smart card 2560 and the staff information, inputs the biometric information (such as the fingerprint) of the staff through the biometric information input device 2525, compares it with the biometric information contained in the staff information, confirms authenticity of the staff carrying the smart card, and then registers the staff information to the temporary storage file 2545. The correct staff verification processing at the terminal is executed by the password information stored in the temporary storage file.

The embodiment described above can confirm authenticity of the staff dispatched from other site and his business right, and can exploit the human resources among a plurality of branches at a relatively low cost while securing security to a certain extent.

As described above, the present invention can improve, at a relatively low cost, security of the security objects inside the security zone which only specific users are allowed to enter and leave.

Furthermore, the present invention can improve, at a relatively low cost, security of security objects inside a plurality of security zones.

What is claimed is:

1. A security system for permitting only an authorized person to conduct a security object action extending to a plurality of security zones, comprising:
   a portable device issued for said authorized person, and storing verification information capable of verifying authenticity of said portable device and inherent information as information inherent to said authorized person of said portable device;
   security zone security means for verifying authenticity of said portable device by using said verification information stored in said portable device carried by a person intending to enter a security zone, permitting admission of said person carrying said portable device, authenticity of which is so verified, into said security zone, and rejecting admission of said person carrying said portable device, authenticity of which is not verified, into said security zone;
   storage means:
   inherent information read means for reading said inherent information stored in said portable device from said portable device, authenticity of which is verified by said security zone security means, and storing said inherent information to said storage means;
   inherent information input means for accepting, when a person having said portable device of verified authenticity intends to conduct said security object action in a first zone, the input of inherent information by said person;
   security object action security means for permitting said security object action of said person as being the authentic person in said first zone when said inherent information accepted by said information input means coincides with said inherent information stored in said storage means, and rejecting said security object action of said person when said inherent information accepted by said information input means does not coincide with said inherent information stored in said storage means; and
   leaving management means for gaining access to said portable device carried by said person leaving said first security zone, stipulating said inherent information stored in said storage means, and erasing said stipulated inherent information from said storage means.

2. A security system according to claim 1, wherein said leaving management means verifies authenticity of said portable device by using said verification information stored in said portable device carried by said person intending to leave said security zone, permitting said person carrying said portable device, authenticity of which is so verified, to leave said first security zone, and rejecting said person carrying said portable device, authenticity of which is not verified, to leave said first security zone.

3. A security system according to claim 2, wherein said inherent information as information inherent to an authentic person to whom said portable device is issued is biometric information of said authentic person.

4. A security system according to claim 1, wherein said security object action is utilization of a computer system installed inside said security zone, or admission into a specific zone inside said security zone.

5. A method of accomplishing security in a security system for permitting only an authentic person to conduct a security object action extending to a plurality of security zones, comprising the steps of:
   issuing a portable device storing verification information capable of verifying authenticity of said portable device and inherent information as information inherent to an authentic user to whom said portable device is issued, to said authentic person;
   verifying authenticity of said portable device by using said verification information stored in said portable device carried by a person intending to enter said security zone in a security system, permitting said user carrying said portable device, authenticity of which is so verified, to enter said security zone, and rejecting a person carrying said portable device, authenticity of which is not verified, to enter said security zone;
   reading said inherent information stored in said portable device from said portable device, authenticity of which is verified, in said security system, and storing said inherent information inside said security system;
   accepting, when a person having said portable device of verified authenticity intends to conduct said security object action in a first zone, the input of inherent information from said person;
   permitting said security object action in said first zone by said person as being the authentic person when said inherent information accepted coincides with said inherent information stored in said security system, and rejecting said security object action by said person when said inherent information accepted by said information input means does not coincide with said inherent information stored in said security system; and
   gaining access to said portable device carried by said person leaving said first security zone in said security system, stipulating said inherent information stored in said security system, and erasing said stipulated inherent information from inside said security system, in said security system.

6. A security system for permitting only an authentic person to conduct a security object action extending to a plurality of zones, comprising:

a portable device issued to said authentic person in common for a plurality of zones, and recording verification information capable of verifying authenticity of said portable device and inherent information as information inherent to said authentic user to whom said portable device is issued;

security zone security means for verifying authenticity of said portable device by using said verification information stored in said portable device carried by a person intending to enter a first security zone of a plurality of said zones, permitting said person carrying said portable device, authenticity of which is verified, to enter said first security zone of a plurality of said zones, and rejecting said person carrying said portable device, authenticity of which is not verified, to enter said first security zone of a plurality of zones;

storage means:

inherent information read means for reading said inherent information stored in said portable device from said portable device, authenticity of which is verified by said security zone security means, carried by said person entering said first security zone of a plurality of said zones, and storing said inherent information in said storage means;

information input means for accepting, when a person having said portable device of verified authenticity intends to conduct said security object action in a first zone, the input of inherent information from said person;

security object action security means for permitting said person as being the authentic person to conduct said security object action in said first zone when said inherent information accepted by said information input means coincides with said inherent information stored in said storage means, and rejecting said person to conduct said security object action when said inherent information accepted by said information input means does not coincide with said inherent information stored in said storage means; and leaving management means for gaining access to said portable device carried by said person leaving said first security zone of a plurality of said zones, stipulating said inherent information stored in said storage means, and erasing said stipulated inherent information from said storage means.

7. A security system for permitting only an authentic person to conduct a security object action extending to a plurality of zones, comprising:

a portable device issued to an authentic person in common to a plurality of said zones, and recording verification information capable of verifying authenticity of said portable device and inherent information as information inherent to said authentic person to whom said portable device is issued;

inherent information read means for gaining access to said portable device carried by a person intending to enter a plurality of said zones and to conduct said security object action, verifying authenticity of said portable device by using said verification information stored, reading said inherent information stored in said portable device from said portable device of said person carrying said portable device authenticity of which is verified, and storing said inherent information to storage means;

inherent information input means for accepting, when a person having said portable device of verified authenticity intends to conduct said security object action in a first zone, the input of inherent information from said person; security object action security means for permitting said person as being the authentic person to conduct said security object action in said first zone when said inherent information accepted by said input means coincides with said inherent information stored in said storage means, and rejecting said person to conduct said security object action when said inherent information accepted by said information input means does not coincide with said inherent information stored in said storage means; and leaving management means for gaining access to said portable device carried by said person leaving said first zone of a plurality of zones, stipulating said inherent information stored in said inherent information storage means, and erasing said stipulated inherent information from said storage means.

8. A security system for permitting only an authentic person to conduct a security object action extending to a plurality of zones, comprising:

a portable device issued to said authentic person in common to a plurality of said zones, and recording verification information capable of verifying authenticity of said portable device and inherent information as information inherent to said authentic person to whom said portable device is issued;

inherent information read means for verifying authenticity of said portable device by using said verification information stored in said portable device carried by a person intending to conduct said security object action in a plurality of said zones, reading said inherent information stored in said portable device from said portable device, authenticity of which is verified, and storing said inherent information to storage means;

inherent information input means for accepting, when a person having said portable device of verified authenticity intends to conduct said security object action in a first zone, the input of inherent information from said person; and security object action security means for permitting said person as being the authentic person to conduct said security object action in said first zone when said inherent information accepted by said information input means coincides with said inherent information stored in said storage means, and rejecting said person to conduct said security object action when said inherent information accepted by said information input means does not coincide with said inherent information stored in said storage means.

9. A security system according to claim 6, wherein said inherent information as the information inherent to said authentic person to whom said portable device is issued is biometric information of said authentic person.

10. A security system according to claim 7, wherein said inherent information as the information inherent to said authentic person to whom said portable device is issued is biometric information of said authentic person.

11. A security system according to claim 8, wherein said inherent information as the information inherent to said authentic person to whom said portable device is issued is biometric information of said authentic person.

12. A security system according to claim 6, wherein said security object action is utilization of a computer system installed in a plurality of said zones.

13. A security system according to claim 7, wherein said security object action is utilization of a computer system installed inside a plurality of said zones.

14. A security system according to claim 8, wherein said security object action is utilization of a computer system installed in a plurality of said zones.

15. A security system for permitting an authentic person to use a terminal or a computer room, comprising:
- a portable device having a verification information issued to an authentic person;
- verification means verifying said verification information by using said portable device carried by a person at an entrance of a building;
- access means reading said verification information out of said portable device to store in said access means;
- second verification means verifying said verification information by reading said verification information from said access means when said person intends to use a terminal or a computer room; and
- erasing means erasing said verification information from said access means when said person leaves said building.

16. A security system according to claim 1, wherein said inherent information read means permits said person to enter a computer room when said inherent information matches said information accepted by said inherent information input means.

17. The security system according to claim 15, further comprising inherent information read means for reading inherent information stored in said portable device from said portable device, the inherent information being information inherent to said authentic user to whom said portable device is issued and authenticity of which is verified by said verification means.

18. The security system according to claim 17, further comprising inherent information input means for accepting, when a person having said portable device of verified authenticity intends to use a terminal or computer room, the input of inherent information by said person.

19. The security system according to claim 18, wherein said inherent information read means permits said person to enter a computer room when said inherent information matches said information accepted by said inherent information input means.

20. A security system according to claim 17, wherein said inherent information is biometric information of said authentic person.

* * * * *